US012603751B2

(12) United States Patent (10) Patent No.: US 12,603,751 B2
Carlson                          (45) Date of Patent:      Apr. 14, 2026

(54) INCOHERENT CLOCKING METHOD

(71) Applicant: National Research Council of Canada, Ottawa (CA)

(72) Inventor: Brent Carlson, Penticton (CA)

(73) Assignee: National Research Council of Canada, Ottawa (CA)

( * ) Notice: Subject to any disclaimer, the term of this patent is extended or adjusted under 35 U.S.C. 154(b) by 407 days.

(21) Appl. No.: 18/550,594

(22) PCT Filed: Mar. 10, 2022

(86) PCT No.: PCT/CA2022/050352
§ 371 (c)(1),
(2) Date: Sep. 14, 2023

(87) PCT Pub. No.: WO2022/192990
PCT Pub. Date: Sep. 22, 2022

(65) Prior Publication Data
US 2024/0171369 A1      May 23, 2024

Related U.S. Application Data

(60) Provisional application No. 63/161,609, filed on Mar. 16, 2021.

(51) Int. Cl.
*H04L 7/02* (2006.01)
*G06F 1/06* (2006.01)

(52) U.S. Cl.
CPC . *H04L 7/02* (2013.01); *G06F 1/06* (2013.01)

(58) Field of Classification Search
CPC ... H04L 7/02; H04L 7/033; G06F 1/06; G06F 5/12
See application file for complete search history.

(56) References Cited

U.S. PATENT DOCUMENTS 5,689,688 A    11/1997  Strong
6,405,269 B1   6/2002   Camilleri
             (Continued)

FOREIGN PATENT DOCUMENTS

WO        2021092704       5/2021
WO     WO-2021092704 A1 *  5/2021   ............. H03L 7/141

OTHER PUBLICATIONS

Carlson B.R: "Incoherent clocking in coherent radio interferometers", Electronics Letters, the Institution of Engineering and Technology,GB,vol. 54,No. 14,Jul. 12, 2018(Jul. 12, 2018), pp. 909-911,XP006075154,ISSN:0013-5194, DOI:10.1049/EL.2018.0964 (Year: 2018).*

(Continued)

*Primary Examiner* — Cheikh T Ndiaye
(74) *Attorney, Agent, or Firm* — Marks & Clerk; Paul Horbal

(57) ABSTRACT

The present invention provides a method and system to correctly sample, at a central location, a signal at a second clock frequency from a remote antenna when the signal is at a first clock frequency. The present invention provides an improved method of incoherent clocking to correctly sample a signal from a remote antenna at a clock frequency of a central location, such as a central site of a radio telescope array. The signal contains a "tracer" which is related to the frequency of the remote antenna. The tracer phase is written into a dual-port memory at the first clock frequency and then read from the memory at the second clock frequency. The tracer phase is transferred across digital clock domains using Gray-doe methods so that phase coding errors do not occur.

8 Claims, 3 Drawing Sheets

(56) References Cited

U.S. PATENT DOCUMENTS

| | | | |
|---|---|---|---|
| 6,650,150 B2 * | 11/2003 | Farine | G01S 19/13 |
| | | | 327/113 |
| 8,982,974 B2 | 3/2015 | Bogdan | |
| 2005/0001748 A1 * | 1/2005 | Clement | H03M 3/496 |
| | | | 341/143 |
| 2014/0205028 A1 | 7/2014 | Bogdan | |

OTHER PUBLICATIONS

Carlson, B. (2021) "A novel clock and timing approach for achieving 200+ km ALMA baselines", arxiv.org, Cornell University Library, 201 Olin Library Cornell University Ithaca, NY 14852, Jul. 9, 2021, XP091010300.
Supplemental European Search Report dated Jan. 17, 2025 for European Application 22770111.7.
L. Fey etal, A Dual Frequency VLF Timing System, IEEE Transactions on Instrumentation and Measurement, vol. IM-15, No. 4, 1966.

A. Lowery et al, Widely-Tunable Low-Phase-Noise Coherent Receiver Using an Optical Wadley Loop, Optical Society of America, 2015.
P. Delos et al, RT Transceivers Enable Forced Spurious Decorrelation in Digital Beamforming Phased Arrays Anolog Devices, Inc.
Lauritzen, K. C. "Correlation of Signals, Noise, and Harmonics in Parallel Analog-to-Digital Converter Arrays", PhD Thesis, University of Maryland, 2009.
Lauritzen, K. C.; Talisa, S. H. & Peckerar, M. "Impact of Decorrelation Techniques on Sampling Noise in Radio-Frequency Applications", IEEE Transactions on Instrumentation and Measurement, 2010, 59, pp. 2272-2279.
Carlson, B., Incoherent clocking in coherent radio terferometers, IEE Electronics Letter, May 2018.
Pietro-Luciano Buono et. al, Phase drift on networks of coupled crystal oscillators for precision timing, Physical Review E 98, 012203 (2018).
International Search Report for PCT Application No. PCT/CA2022/050352 dated Jun. 14, 2022.
Written Opinion of the International Search Authority for PCT Application No. PCT/CA2022/050352 dated Jun. 14, 2022.

* cited by examiner

INCOHERENT CLOCKING METHOD

TECHNICAL FIELD OF THE INVENTION

The present invention relates to a clock and timing solution for an antenna of a radio telescope antenna array.

BACKGROUND OF THE INVENTION

The timing of radio telescope arrays is vital to its operation. Current methods of timing delivery to each antenna of a radio telescope array include passive clock distribution via stabilized media, moving the analogue RF signal from each element to a central location via coax or fiber to compact the area over which clock distribution must occur and therefore simplify it, or active round-trip phase-corrected clock "steering" using specialized photonics methods. Each of these methods has its advantages and limitations, in terms of distance over which the clock can be distributed, clock frequency, and signal fidelity. The method of "incoherent clocking" as disclosed in Carlson, B.R., "Incoherent clocking in coherent radio interferometers," IEE Electronics Letters 54(14), 909-911 (2018) aims to provide a cost-effective, all-digital clock and timing solution for any cost, scale, and frequency of radio telescope. With incoherent clocking, rather than distribute a common clock to all elements, each antenna performs down-conversion and digitization using its own free-running independent local oscillator (LO), measuring its frequency sufficiently accurately in a reference/common clock domain, and then digitally re-sampling (i.e. interpolating) the data accordingly prior to final operations such as correlation and beamforming. All of these operations, including measuring and compensating for element-to-central media instabilities, are performed using all-digital methods in readily available digital devices such as Field Programmable Gate Arrays (FPGAs), using Commercial Off-The-Shelf (COTS) digital fiber optic modules, and the most inexpensive fiber routing there is, namely aerial fiber using digital communications-grade cable (e.g. "loose-tube" without special vibration dampening gel), for element-to-central communications. All serial communications occurring over fiber, and the operation of IC itself, is within industry-established SERDES (SERializer/DESerializer) jitter masks—there is no specialized tuning or operation outside COTS specifications.

A simplified block diagram of the incoherent clocking method is shown in FIG. 1. In this diagram each antenna performs down-conversion (if required, not shown) and digitization using its own antenna LO (aLO) and its timing is transferred, intrinsically with the clocking of digitized data into a serial stream, to the central site via full-duplex/bi-directional fiber link. In FIG. 1, an example antenna 10 is shown of a radio telescope antenna array (not shown). The antenna 10 is located remotely from a central site 20 of the radio telescope antenna array. The antenna 10 receives an analog radio frequency (RF) signal 11 containing science data. In particular, the RF signal 11 is input into an analog to digital converter (ADC) 12. Clocking of the ADC 12 is provided by aLO 13. The converted digital data 14 that is output from ADC 12 is input into a digital serial transceiver 15. The digitized data that is output from digital serial transceiver 15 is transmitted as a serial stream to the central site 20 via a full-duplex fiber link 30. As shown, the timing of the aLO 13 is transferred intrinsically with the clocking of the digitized serial stream to the central site 20. At the central site 20, a digital serial transceiver 21 receives the digitized serial data stream transmitted over the fiber link 30.

The timing of the aLO 13 clock is recovered from the processing of the digitized serial data stream in digital serial transceiver 21 and is input into block 22 along with the digitized data. In block 22, the digitized data is "corrected" from clocking in the aLO 13 domain to the domain of a common central LO clock 23 of the central site 20. The fibre link delay of the fibre link 30 is continuously measured by the central site 20 via a round-trip phase measurement (not shown). This measurement is included in the "corrections" to the digitized data received from the remote antenna 10. The digitized data output from block 22 is then "corrected" to the common clock 23 of the central site 20 and can then be used for further operations such as correlation and beamforming.

One of the drawbacks with Carlson, B. R., "Incoherent clocking in coherent radio interferometers," IEE Electronics Letters 54(14), 909-911 (2018) may include beating effects due to sampling of the digital discrete-time waveform derived from the serial receiver 21 with the sampling frequency derived from the central LO 23. If the frequency of the waveform is harmonically related to the sampling frequency derived from the central LO, then there will be indeterminate periods of time when the discrete-time waveform is repetitively sampled at particular phase epochs—when the phase of the waveform naturally drifts, at some point a discrete phase jump happens in the sampled phase, introducing a discontinuity in the sampled waveform to be measured. This effect can be entirely mitigated by ensuring that the discrete-time waveform is at a frequency such that it is always repetitively sampled at different phases so that no such phase discontinuity in the sampled waveform ever occurs.

SUMMARY OF THE INVENTION

The present invention aims to overcome the problem of beating effects described above.

According to an aspect of the present invention, there is provided a method of sampling, at a central site of a radio telescope array, a signal at a second clock frequency from a remote antenna when the signal is at a first clock frequency, the method comprising:

a. receiving the signal from a remote antenna;

b. converting the signal into a first binary format;

c. writing the signal into successive first addresses of a dual-port memory at each clock cycle of the first clock frequency, wherein the first addresses are generated by an address counter in the first binary format;

d. converting the first addresses in the first binary format from the address counter into intermediate addresses in a second binary format;

e. writing the intermediate addresses in the second binary format into at least one register at each clock cycle of the second clock frequency, wherein the second clock frequency is larger than the first clock frequency;

f. converting the intermediate addresses, from the at least one register, from the second binary format into the first binary format to generate successive read addresses; and g. reading the signal from the dual-port memory at the generated read addresses at each clock cycle of a multiple of the second clock frequency.

In some embodiments of the present invention, there is provided the method as described herein, wherein the second binary format is Gray code.

In some embodiments of the present invention, there is provided the method as described herein, wherein the at least on register comprises a shift register.

In some embodiments of the present invention, there is provided the method as described herein, wherein the at least on register comprises a decimation register.

In some embodiments of the present invention, there is provided the method as described herein, wherein the at least on register comprises a shift register.

In some embodiments of the present invention, there is provided the method as described herein, wherein the multiple of the second clock frequency comprises 0.25.

In some embodiments of the present invention, there is provided the method as described herein, wherein:

a. a round-trip tracer phase is measured;
    b. the round-trip-measured tracer phase is transmitted to the central site;
    c. the round-trip-measured tracer phase is used as a compensating factor into the central-site frequency tracker;
    d. the central-site frequency tracker measures the tracer frequency;
    e. the tracer frequency from the frequency tracker is filtered with a digital low-pass filter to remove confusing effects;
    f. the low-pass filtered tracer frequency is used to re-sample and phase-correct the digitized science data; and
    g. the digitized science data may be delayed by the same amount as the delay of the frequency tracker and low-pass filter to ensure that the measured and filtered tracer frequency is applied to the digitized science data at the time when the digitized science data was down-converted and digitized at frequencies directly proportional to the applied tracer frequency measurement.

According to another aspect of the present invention, there is provided a system at a central site of a radio telescope array for sampling a signal at a second clock frequency from a remote antenna when the signal is at a first clock frequency, the system comprising:

a. a transceiver that receives the signal from a remote antenna;
    b. a first converter for converting the signal into a first binary format;
    c. an address counter for generating successive first addresses in the first binary format;
    d. a dual-port memory that stores the signal at the successive first addresses at each cycle of the first clock frequency;
    e. a second converter for converting the first addresses in the binary format from the address counter into intermediate addresses in a second binary format;
    f. at least one register that stores the intermediate addresses in the second binary format at each clock cycle of the second clock frequency, wherein the second clock frequency is larger than the first clock frequency; and
    g. a third converter that converts the intermediate addresses from the at least one register from the second binary format into the fist binary format to generate successive read addresses, wherein the signal from the dual-port memory is read from the dual-port memory at the generated ready addresses at each clock cycle of a multiple of the second clock frequency.

DETAILED DESCRIPTION

Figure 1:
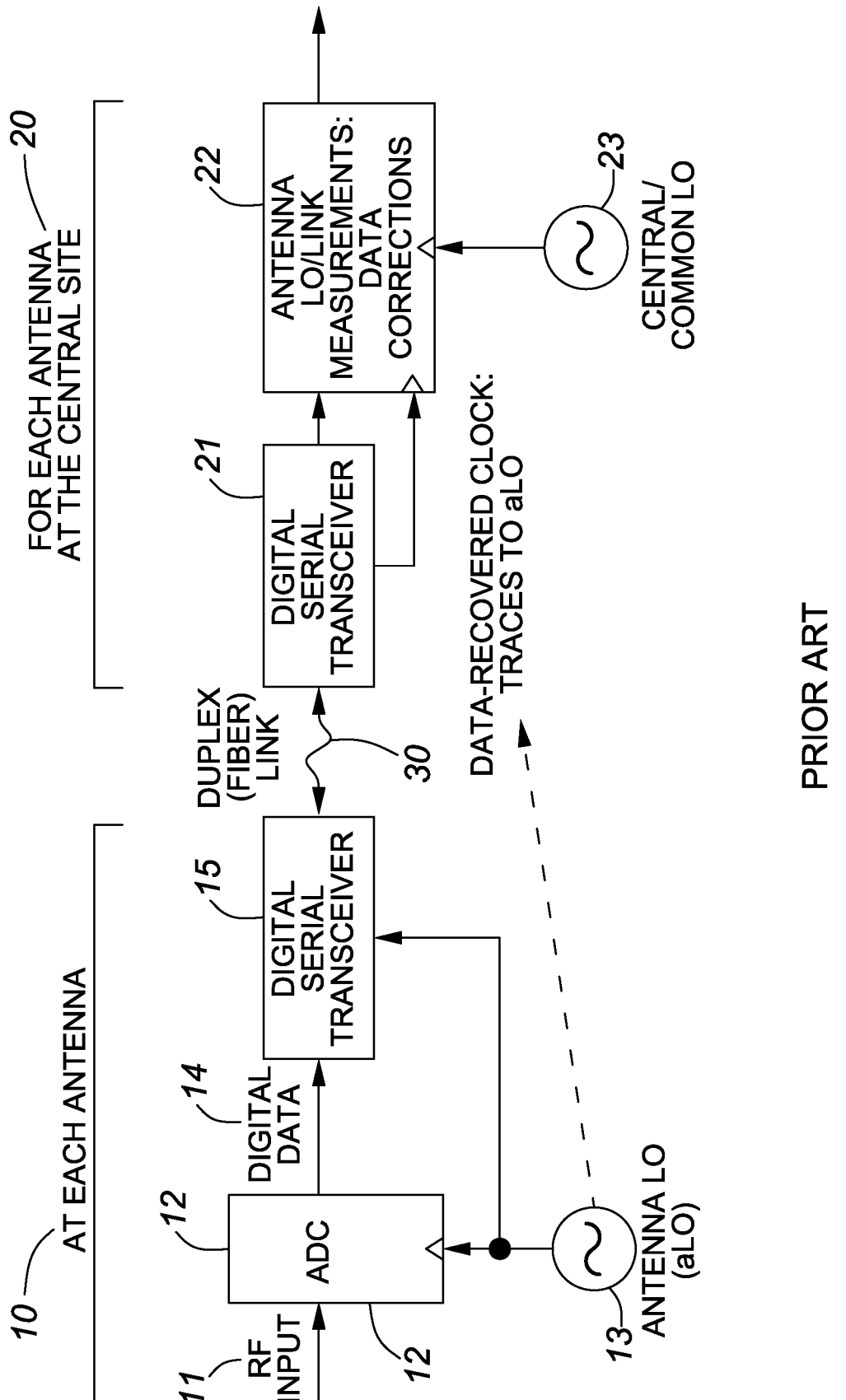
FIG. 1 shown a simplified block diagram of the incoherent clocking method.
Figure 2:
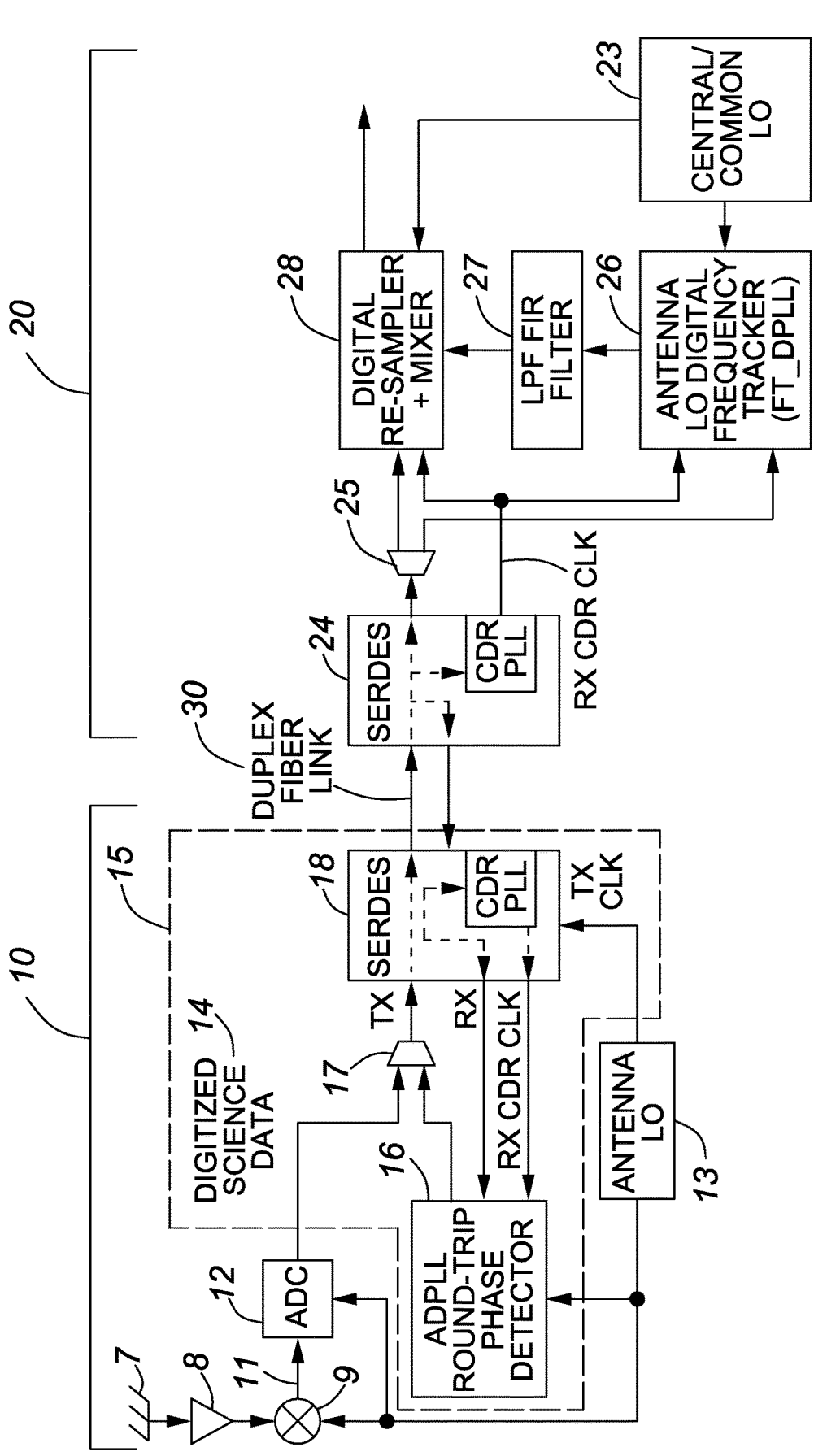
FIG. 2 shows a more detailed implementation of the incoherent clocking method as shown in FIG. 1.

FIG. 2 shows a detailed implementation of FIG. 1, which is a typical implementation, but not the only one. An antenna 10 is shown that is remote from a central site 20 of a radio telescope antenna array. The antenna 10 receives data in form of an RF signal 7. RF signal 7 is amplified by amplifier 8 and down conversion 9 is performed, if required, using the clock of the antenna LO (aLO) 13. The RF signal 11 is then input into ADC 12. Clocking of the ADC 12 is based on the aLO 13. The digitized science data 14 is then input into digital serial transceiver 15 which can be implemented by a field-programmable gate array (FPGA).

The digitized science data and incoherent clocking signaling from a round-trip phase detector 16 are merged together by multiplexer 17 into serializer/deserializer (SERDES) 18. SERDES 18 converts the digitized science data into a serial stream for transmission over the full duplex/bidirectional fiber link 30. The digitized serial stream is processed at the central site 20 but also looped-back to the remote antenna 10. This loopback must retain timing information contained in the received digitized serial stream, although it can filter out jitter occurring on timescales faster than aLO frequency variations that need to be measured and corrected.

The incoherent clocking signaling comprises "tracer" signaling, which contains a pulse for a round-trip delay measurement, the streaming round-trip measured tracer phase, and—on the pulse—the current tracer phase at each tracer DDS 40. The term "tracer" is a term used in incoherent clocking to refer to a high signal-to-noise ratio (SNR) complex digital tone which is typically around 10 MHz. This tone is developed for local use in various places by a Direct Digital Synthesizer (DDS) (not shown) driven by various clocks such as the SERDES CDR PLL-recovered clock. There is a fixed a priori established ratio, in any IC design, of the heterodyne down-conversion LO and ADC clock frequencies to the tracer frequency. Additionally, the tracer phase is transferred across digital clock domains using Gray-code methods so that phase coding errors do not occur, and intelligent choice of the tracer frequency prevents any beating effects that might occur, for instance if the aLO frequency is, for a short period of time, very close to the reference clock frequency.

Returning to FIG. 2, when transmitting the digitized serial stream, a first DDS (not shown) in the round-trip phase detector 16 is driven by aLO. When looped-back, a second DDS (not shown) in 16 is driven by the signal RX_CDR_CLK, which is a clock signal synchronous with the received data. The phase of this data-recovered clock is perturbed by fiber delay variations, which in turn perturbs the tracer phase by a proportional amount. The round-trip phase detector in 16 continuously measures the phase of the tracer loopback return side relative to the transmit side, divided by 2, and sent as a continuous stream of phase measurements, typically every 10 μs to the central site 20. The measurement is "round-trip" so it therefore measures the contribution of both directions of fiber, but as only one direction of the compensation is desired, the round-trip measurement is divided by 2. These measurements form part of the incoherent clocking signaling that is merged with the digital science data by multiplexer 17 before being transmitted to the central site 20.

At the central site 20, SERDES 24 at the central site 20 recovers the digitized science data from the digitized serial stream received over the fiber link 30. SERDES 24 also extracts the signal RX_CDR_CLK as well as the incoherent clocking signaling. As described above, the incoherent clocking signaling comprises tracer signaling, including the streaming round-trip measured tracer phase. A demultiplexer 25 demultiplexes the data signal output from SERDES 24 into the digitized science data and the incoherent clocking signaling.

An aLO digital frequency tracker 26 at the central site 20 uses the round-trip-measured phase measurements from the incoherent clocking signaling as compensating input to remove effects of fiber delay perturbations on timescales that are confused with aLO frequency variations. Faster variations that cannot be relied on due to the length of the fiber link 30 are ultimately filtered out by the low pass filter (LPF) finite impulse response (FIR) filter 27. The signal RX_CDR_CLK also drives a local tracer DDS (not shown) in the aLO digital frequency tracker 26 in the central site 20. The digitized science data is written into the digital re-sampler and mixer 28. The tracer signaling and round trip-calculated streaming tracer phase measurements are used by antenna LO digital frequency tracker 26 to sufficiently and precisely measure the local tracer output frequency of the DDS located therein. This measurement of the local tracer output frequency of the DDS, after the LPF 27, must be at a sufficient level of accuracy and precision for correcting the digitized science data. Since there is a delay through the LPF 27 that can be quite large, memory in the Re-Sampler 28 can be sized to match it, ensuring that the frequency measurement out of the LPF is applied at the correct time. This is a major advantage of the incoherent clocking technique over other round-trip clock steering approaches. Measured frequency variations can be applied to the data at the time when they happened rather than, effectively, some lag time later.

The filtered tracer frequency measurements, f_tracer(t), are multiplied-up to the antenna ADC frequency and, if equipped, the heterodyne mixer 9 frequency, and drive the digital re-sampler and mixer 28. The output of the digital re-sampler and mixer 28 represents the final "corrected" output in the common clock 23 of the central site 20.

As described above, both the phase detector 16 and the aLO digital frequency tracker 26 make use of tracer signaling and the round-trip measured phase. In both the phase detector 16 and the aLO digital frequency tracker 26, it is necessary to sample the tracer phase to a common clock domain, either to the clock domain of the aLO 10 or the clock domain of the central site 20. To do this, the tracer phase is transferred across digital clock domains using Gray-code and dual-port memory methods. The inventor has discovered that using these methods allows for any arbitrary tracer frequency to be used; with proper choice of tracer frequency any beating effects are entirely removed.

Figure 3:
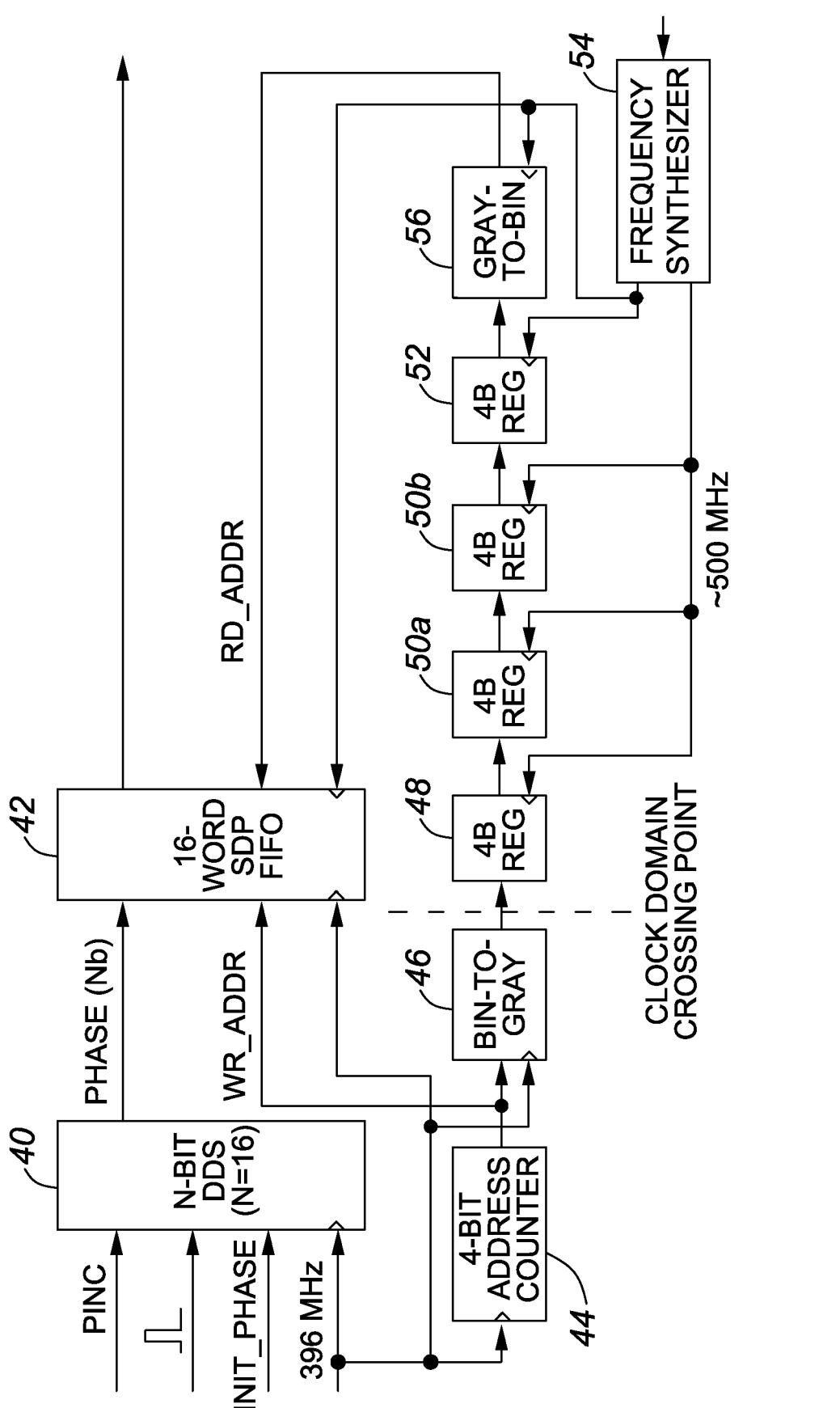
FIG. 3 shows a phase generator/sampler at the central site.

The use of Gray-code and dual-port methods is described in more detail in FIG. 3. The pulse of the tracer signaling is input into a 16-bit DDS 40, although any number of bits can be used for the DDS, as well as the tracer phase present at the antenna at that same pulse epoch, thereby synchronizing tracer phases across the fiber link. This pulse and phase representing the tracer signaling is synchronous with the RX_CDR_CLK clock, for example 396 MHZ, The 16-bit DDS is a structure comprising a phase increment ("pinc") register and accumulator. Every 396 MHz clock cycle a phase increment, pinc, is added to the phase register to produce a sawtooth PHASE waveform. The tracer frequency $f_{tracer}$, is always related to the aLO by the following equation:

$$f_{tracer} = \frac{pinc}{2^{Nb\_DDS}} \times f_{DDS}$$

where $f_{DDS}$ is the aLO-derived frequency of the clock used to clock the DDS, and Nb_DDS is the number of bits in the DDS. In the present case, $f_{DDS}$ is 396 MHz. The sawtooth waveform represents the tracer phase synchronous with the 396 MHz clock.

The output signal of the 16-bit DDS 40 is a 16-bit binary number sampled at 396 MHz. The next step is to sample the tracer phase into a clock domain of the central site 20 which is different from the remote antenna clock domain, present at the central site as the RX_CDR_CLK domain. Attempting to simply sample the 16-bit DDS output into a different clock domain will result in coding errors. On a sampling clock edge, if the setup and hold times of the input signal to a digital storage register are incorrect, the sampled output is indeterminate resulting in coding errors when more than 1 bit of a word with an arbitrary bit pattern is sampled. Accordingly, the inventor decided to use a memory structure to store the tracer phase. In particular, the tracer phase is written into a memory structure such as a simple dual port first-in, first-out (FIFO) buffer 42. The FIFO buffer 42 has a write port with a corresponding independent write clock and a read port with a corresponding independent read clock. The FIFO buffer 42 comprises random-access memory (RAM). At each clock cycle of the 396 MHz reference clock, the output of the 16-bit DDS 40 representing the tracer phase is written into the FIFO buffer 42. The invention is not limited to a 16-bit DDS. A DDS of any number of bits can be used. A 4-bit address counter 44 provides the write addresses for the FIFO buffer 42. When the tracer phase is read out from FIFO buffer 42, the reference clock of the central site 20 is used. The tracer phase is written into the FIFO buffer 42 without error.

To ensure that the tracer phase is accurately read out, it is important that coding errors are avoided. An established method of ensuring there are no coding errors across digital clock domain crossings is to use Gray code. Gray code is an ordering of the binary numeral system where two successive values differ in only one bit. As only one bit is being changed the chance of sampled code errors is eliminated compared to binary numeral system where multiple bits can change between successive values, provided the sampling clock frequency is sufficiently higher than the source clock frequency. The conversion from binary to Gray code is done by binary-to Gray code converter 46 which uses a well-known algorithm to convert the output of the 4-bit address counter 44 into Gray code. It is known that Gray code will only work if there are $2^n$ states where n is the number of bits. As the input to the binary-to-Gray code converter 46 is 4 bits, there will be 16 states. It is also possible to combine the functions of the 4-bit address counter 44 and the binary-to-Gray code converter 46 by simply using a Gray-code counter. The output of the binary-to-Gray code converter 46 is input into a 4-bit register 48. It is here that the clock domain crosses over from the 396 MHz domain into the clock domain of the central site 20. The clock domain of the central site 20 should be sufficiently larger than the originating clock domain to ensure that no state is missed which would result in Gray-code errors when the clock domain crosses over from one clock domain to the next. It is important that no state is missed. The inventor realized that a clock domain of ~500 MHz would work, although any appropriate frequencies for both can be used. Every 396 MHz, the output of the binary-to-Gray converter 46 changes by one bit. This one bit change every 396 MHz is put into 4-bit register 48, but register 48 is clocked at 500 MHZ.

From the 4-bit register 48, the Gray code passes into metastability resolution registers 50a and 50b. To ensure reliable operation, the input to a register must be stable for a minimum time before the clock edge (setup time) and for a minimum time after the clock edge (hold time). The register output is then available after a specified clock-to-output delay. If a data signal transition violates a register's setup or hold time requirements, the output of the register may go into a metastable state. In a metastable state, the register output hovers at a value between high and low states for some period of time inversely proportional to the register's speed, which means the output transition to a defined high or low state is delayed beyond the specified clock-to-output delay. To minimize the failures due to metastability in clock domain crossovers, a sequence of registers in the 500 MHz clock domain is used to resynchronize the Gray code signal to the new 500 MHz clock domain. The Gray code signal being output from the metastability resolution registers 50a and 50b is now correctly being sampled at the new 500 MHz clock domain. While subsequent processes can continue to be sampled at 500 MHz clock domain, it is more challenging to meet timing requirements in digital logic at this speed. Accordingly, to simplify timing, a 500 MHz/4=125 MHz clock can be used for decimation register 52, and all subsequent processing of the sampled tracer phase. The FIFO and Gray code ensure there are no sampled tracer phase code errors. Once the tracer phase is sampled, it is possible to just use and process every Nth phase sample (i.e. decimate), provided that Nyquist zone-1 sampling of the tracer phase is satisfied. This allows the following logic to run at a lower speed.

The 500 MHz and 125 MHz clocks can be supplied by a frequency synthesizer 54, for example. The 125 MHz is not a requirement of the invention, but rather an embodiment of the invention that simplifies the digital logic timing. The output of decimation register 52 is then input into a Gray code-to-binary converter 56 and a binary read address is output. This read address is inherently delayed by binary-to-Gray converter 46, registers 48, 50a, 50b and 52 and Gray-to-binary converter 56, so it lags the write address, to avoid RAM write/read memory access contention. However, this lag can't be more than the 4-bit repeat sequence—if so, then 4 bits can be increased to, for example, 5 bits; similarly, 4 bits can be decreased to, for example, 3 bits if the lag from binary-to-Gray converter 46, registers 48, 50a, 50b and 52, and Gray-to-binary converter 56 is small enough. This binary address is used as a read address for the FIFO buffer 42 to select the phase at this given read address. The phase is then read out at a clock frequency at each clock cycle of a multiple of the 500 MHz clock, for example 125 MHz. The phase output is now sampled at a multiple of the central clock. This phase output is then sent on for further processing.

The combination of the FIFO 42 and Gray-code phase sampling 44-56 allows for any arbitrary pinc to be chosen; with appropriate choice, beating effects previously mentioned, can be entirely avoided.

The embodiments of the invention in which an exclusive property or privilege is claimed are defined as follows:

1. A method of sampling, at a central location, a signal at a second clock frequency from a remote antenna when the signal is at a first clock frequency, the method comprising:
   a. receiving the signal from the remote antenna;
   b. converting the signal into a first binary format;
   c. writing the signal into successive first addresses of a dual-port memory at each clock cycle of the first clock frequency, wherein the first addresses are generated by an address counter in the first binary format;
   d. converting the first addresses in the first binary format from the address counter into intermediate addresses in a second binary format;
   e. writing the intermediate addresses in the second binary format into at least one register at each clock cycle of the second clock frequency, wherein the second clock frequency is larger than the first clock frequency;
   f. converting the intermediate addresses, from the at least one register, from the second binary format into the first binary format to generate successive read addresses; and
   g. reading the signal from the dual-port memory at the generated read addresses at each clock cycle of a multiple of the second clock frequency.

2. The method of claim 1, wherein the second binary format is Gray code.

3. The method of claim 1, wherein the at least one register comprises a shift register.

4. The method of claim 1, wherein the at least one register comprises a decimation register.

5. The method of claim 1, wherein the multiple of the second clock frequency comprises 0.25.

6. The method of claim 1 wherein:
   a. a round-trip tracer phase is measured to obtain a round-trip-measured tracer phase;
   b. the round-trip-measured tracer phase is transmitted to a central site;
   c. the round-trip-measured tracer phase is used as a compensating factor into a central-site frequency tracker;
   d. the central-site frequency tracker measures a tracer frequency;
   e. the tracer frequency from the central-site frequency tracker is filtered with a digital low-pass filter to remove confusing effects, to obtain a low-pass filtered tracer frequency;
   f. the low-pass filtered tracer frequency is used to re-sample and phase-correct the signal; and
   g. the signal is delayed by the same amount as the delay of the central-site frequency tracker and the digital low-pass filter to ensure that the low-pass filtered tracer frequency is applied to the signal when the signal is down-converted and digitized at frequencies directly proportional to the tracer frequency.

7. The method of claim 1, wherein the central location is a central site of a radio telescope array.

8. A system at a central site of a radio telescope array for sampling a signal at a second clock frequency from a remote antenna when the signal is at a first clock frequency, the system comprising:
   a. a transceiver that receives the signal from the remote antenna;
   b. a first converter for converting the signal into a first binary format;
   c. an address counter for generating successive first addresses in the first binary format;

d. a dual-port memory that stores the signal at the successive first addresses at each cycle of the first clock frequency;

e. a second converter for converting the first addresses in the first binary format from the address counter into intermediate addresses in a second binary format;

f. at least one register that stores the intermediate addresses in the second binary format at each clock cycle of the second clock frequency, wherein the second clock frequency is larger than the first clock frequency; and g. a third converter that converts the intermediate addresses from the at least one register from the second binary format into the first binary format to generate successive read addresses, wherein the signal from the dual-port memory is read from the dual-port memory at the generated successive read addresses at each clock cycle of a multiple of the second clock frequency.

* * * * *